(12) United States Patent
Klug et al.

(10) Patent No.: US 6,233,996 B1
(45) Date of Patent: May 22, 2001

(54) DRIVING MECHANISM FOR INDUSTRIAL INSTALLATIONS, IN PARTICULAR FOR PRIMARY INDUSTRY INSTALLATIONS

(75) Inventors: Rolf-Dieter Klug, Nürnberg; Theodor Salzmann, Spardorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/355,711

(22) PCT Filed: Jan. 21, 1998

(86) PCT No.: PCT/DE98/00181

§ 371 Date: Oct. 22, 1999

§ 102(e) Date: Oct. 22, 1999

(87) PCT Pub. No.: WO98/34336

PCT Pub. Date: Aug. 6, 1998

(30) Foreign Application Priority Data

Feb. 4, 1997 (DE) .............................. 197 04 122

(51) Int. Cl.[7] .................................................. B21B 31/07
(52) U.S. Cl. ................................................................ 72/249
(58) Field of Search .............................. 72/249, 7.1, 8.1, 72/10.4, 10.2, 13.4

(56) References Cited

U.S. PATENT DOCUMENTS 5,514,944 * 5/1996 Miyazaki .............................. 318/800
5,797,288 * 8/1998 Mas ........................................ 72/7.1
5,860,310 * 1/1999 Wokusch ................................ 72/249

FOREIGN PATENT DOCUMENTS

| 44 22 275 | * 12/1995 | (DE) . |
| 0 630 099 | 12/1994 | (EP) . |
| 2 161 994 | 7/1973 | (FR) . |
| WO 92 15148 | 9/1992 | (WO) . |

OTHER PUBLICATIONS

T. Salzmann et al., "High–Power Drive System With Advanced Power Circuitry and Improved Digital Control", Jan. 1, 1991, Proceedings of the Industry Applications Society Annual Meeting, Dearborn Sep. 28–Oct. 1, 1991, vol. 1, pp. 272–278, Institute of Electrical and Electronics Engineers*.

* cited by examiner

*Primary Examiner*—Rodney A. Butler
(74) *Attorney, Agent, or Firm*—Kenyon & Kenyon

(57) ABSTRACT

A drive system for industrial plant sections, in particular for system sections in the basic industries, having at least one electric motor and at least one converter with a voltage link, through which the electric motor is connected to an AC-voltage power supply network, the converter regulating the power consumption or torque and rotation speed of the electric motor from the AC-voltage power supply network.

14 Claims, 5 Drawing Sheets

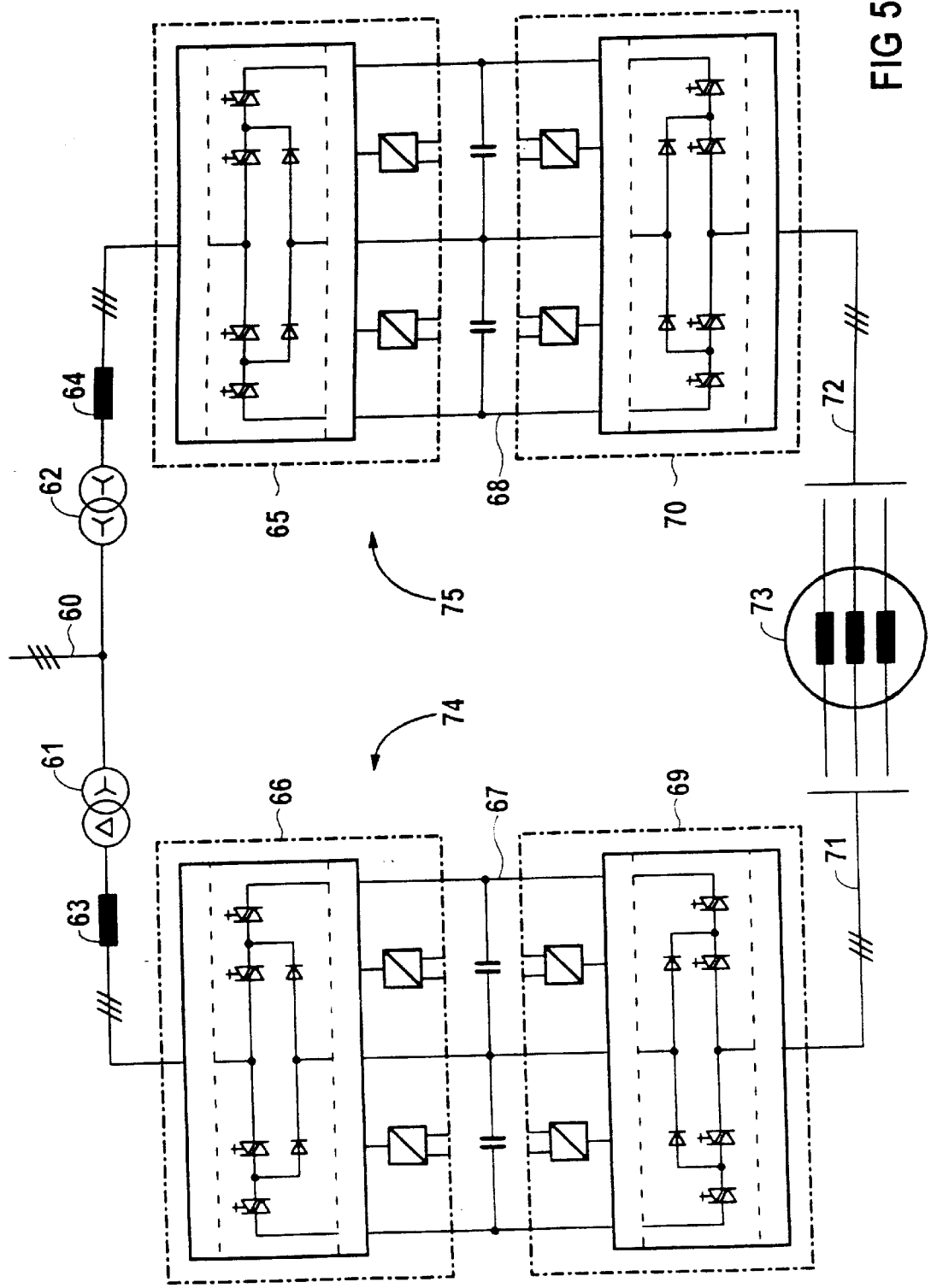

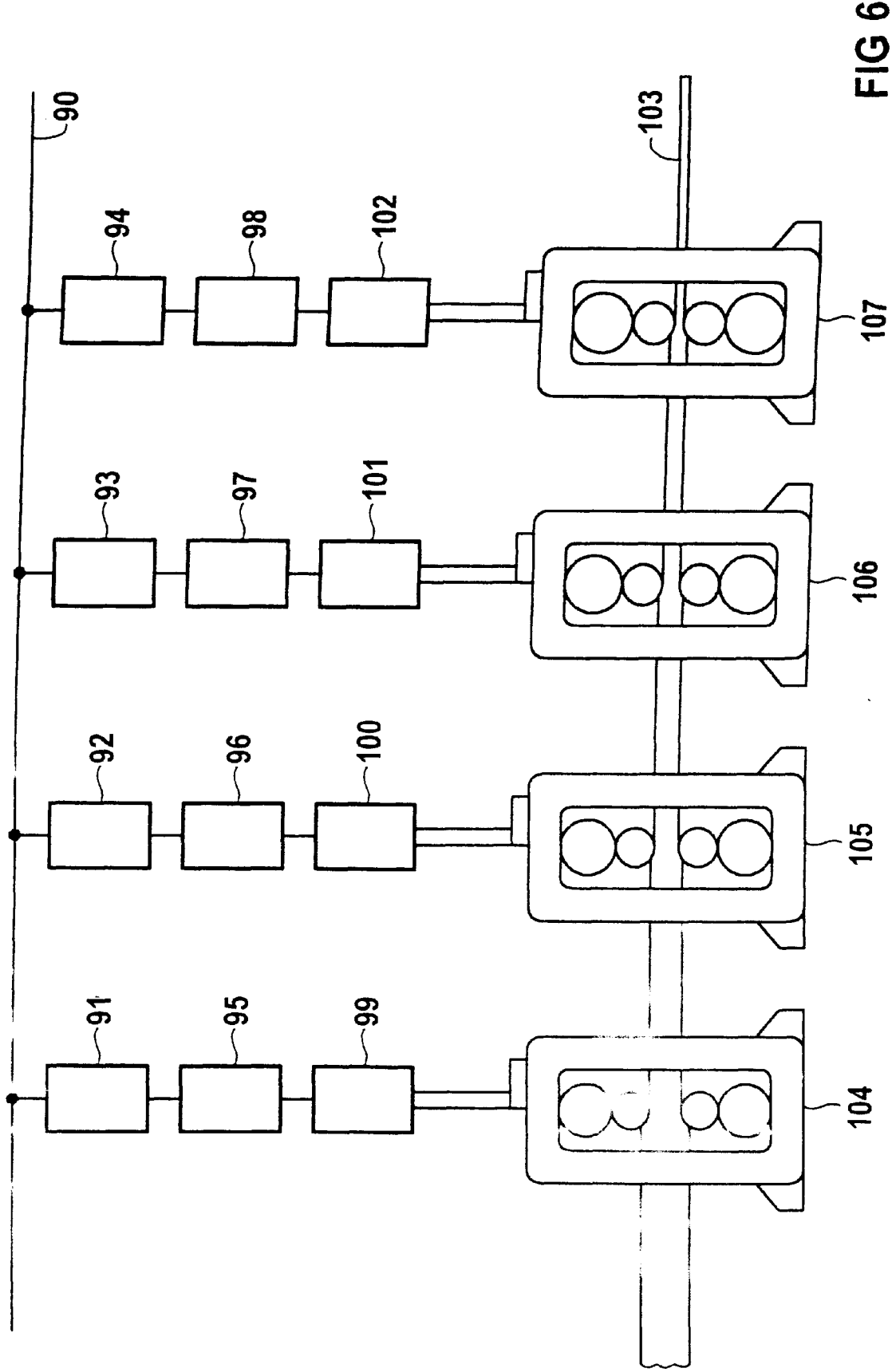

DRIVING MECHANISM FOR INDUSTRIAL INSTALLATIONS, IN PARTICULAR FOR PRIMARY INDUSTRY INSTALLATIONS

FIELD OF THE INVENTION

The present invention relates to a drive system for industrial plants, in particular for systems in the basic industries, having at least one electric motor and at least one converter with a voltage link.

BACKGROUND INFORMATION

High-performance variable speed drives and their converters place a considerable load on the power supply lines due to current harmonics. Therefore, the use of such drives requires that their converters be equipped with expensive filter circuits in order to reduce these harmonics. It is known that harmonic components can be reduced by the use of self-commutated converters having gate turn-off power semiconductors. However, at a low pulse frequency, in particular at a pulse frequency as low as the fundamental oscillation of the AC-voltage power supply network powering the drive device, a self-commutated converter may not be able to reduce the harmonics to the desired degree. Therefore, even with this measure, the use of expensive filter circuits may be necessary. This problem occurs in particular with rolling stand drives.

W/O 92/15148 describes another option for compensating harmonics. According to this reference, residual degrees of freedom in a motor control are used for minimizing an interference index. The interference index is defiend as the sum of squares or the absolute values of the difference between setpoint current and actual current.

World Patent 92/15148 discloses another option for compensating harmonics. According to this document, residual degrees of freedom in a motor control are used for minimizing an interference index. The interference index is defined as the sum of squares or the absolute values of the difference between setpoint current and actual current.

The object of the present invention is to provide a drive system for which the harmonics injected in the power supply line are reduced. In doing so, it is desirable that the drive system be designed to be more cost effective compared to known drive systems having reduced harmonics.

This object is achieved according to the present invention through a drive system according to Claim 1, according to which the link voltage of the converter is set so that the harmonics computes the link voltage as a function of the AC-voltage power supply network voltage.

The drive system according to the present invention is particularly advantageous in a power range of 1–20 MW, advantageously between 2–10 MW or, for impact load, in a power range of 2–30 MW, advantageously between 4–20 MW.

The drive system according to the present invention has been found to be particularly advantageous in connection with three-phase motors connected in tandem, i.e., in circuits where the three-phase motor has open windings, which are supplied by converters on both sides.

The drive system according to the present invention is particularly advantageous for driving rolling stands of a rolling mill train.

The converter of the drive system according to the present invention can also be designed as an air-cooled converter.

BRIEF DESCRIPTION OF THE DRAWINGS

FIG. 5 shows a converter arrangement for supplying on both sides a three-phase motor having an open winding, with converter sections connected in delta.

FIG. 6 shows the use of a drive system according to the present invention in a rolling mill.

DETAILED DESCRIPTION

Figure 1:
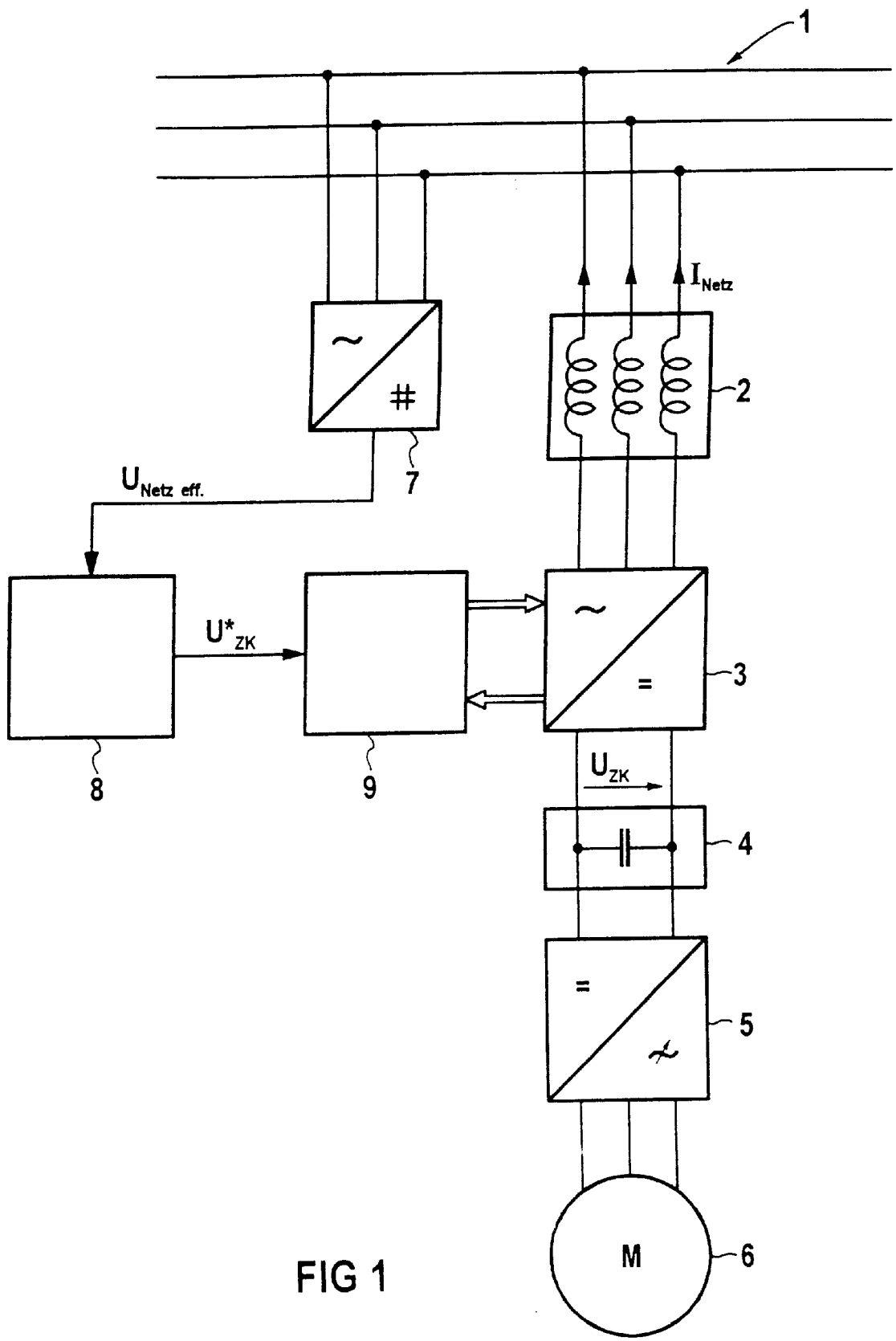
FIG. 1 shows a drive system according to the present invention.

FIG. 1 shows a drive system according to the present invention. A three-phase motor 6 is supplied with power through a converter and a transformer 2 or inductors via an AC-voltage power supply network 1. The converter has a self-commutated rectifier 3 with gate turn-off power semiconductors, a DC voltage link 4, whose link voltage $U_{ZK}$ is set and regulated by rectifier 3, and a self-commutated AC converter 5 for regulating three-phase motor 6. Self-commutating rectifier 3 is regulated via a regulator 9 so that a link voltage $U_{ZK}$ is established according to a predefined setpoint value $U^*_{ZK}$. Link setpoint voltage $U^*_{ZK}$ is computed using a link voltage computing device 8, which determines link setpoint voltage $U^*_{ZK}$ as a function of the AC voltage of AC-voltage power supply network 1. For this purpose, the drive system according to the present invention advantageously has a measurement device 7 for measuring the effective value $U_{netz\ eff}$ of the line voltage of AC-voltage power supply network 1.

Figure 2:
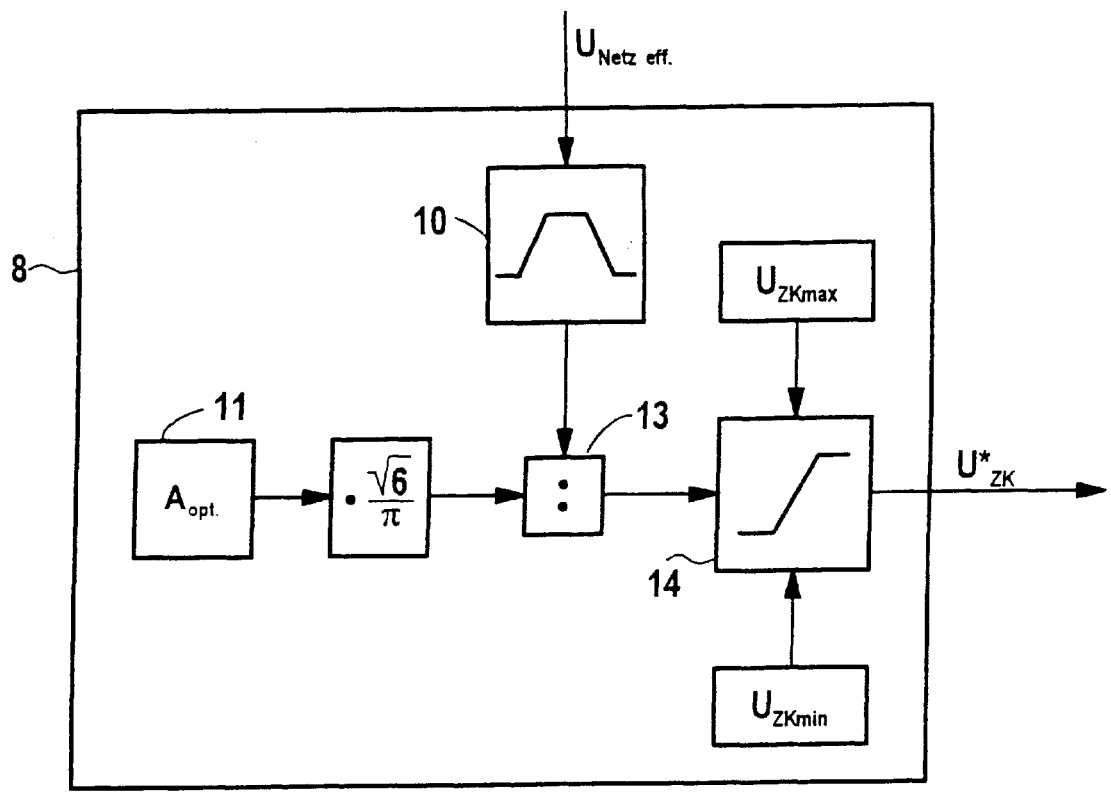
FIG. 2 shows a link voltage computing system.

FIG. 2 shows the details of a link voltage computing device 8. The output signal of a control factor selector 11 for selecting an optimum control factor with regard to the total harmonic distortion, i.e., the harmonics content of input current $I_{Netz}$ (see FIG. 1) is multiplied by the constant $\sqrt{6}/n$. The effective voltage $U_{netz\ eff}$ of the AC-voltage power supply network is divided by this value. In an advantageous embodiment, the rate of change of effective voltage $U_{netz\ eff}$ of the AC-voltage power supply network is, however, initially limited by a change limiter 10. The minimum link voltage $U_{ZKmin}$ is set so that self-commutating AC converter 5 (see FIG. 1) can provide three-phase motor 6 with a sufficiently high effective power. The maximum link voltage $U_{ZKmax}$ is set so that the power semiconductor of self-commutating DC converter 3 and self-commutating AC converter 5 (see FIG. 1) are not damaged. The output signal of divider 13 is sent to a limiter 14, whose limit values are the minimum link voltage $U_{ZKmin}$ and the maximum link voltage $U_{ZKmax}$. The output signal of limiter 14 is a setpoint link voltage $U^*_{ZK}$.

Figure 3:
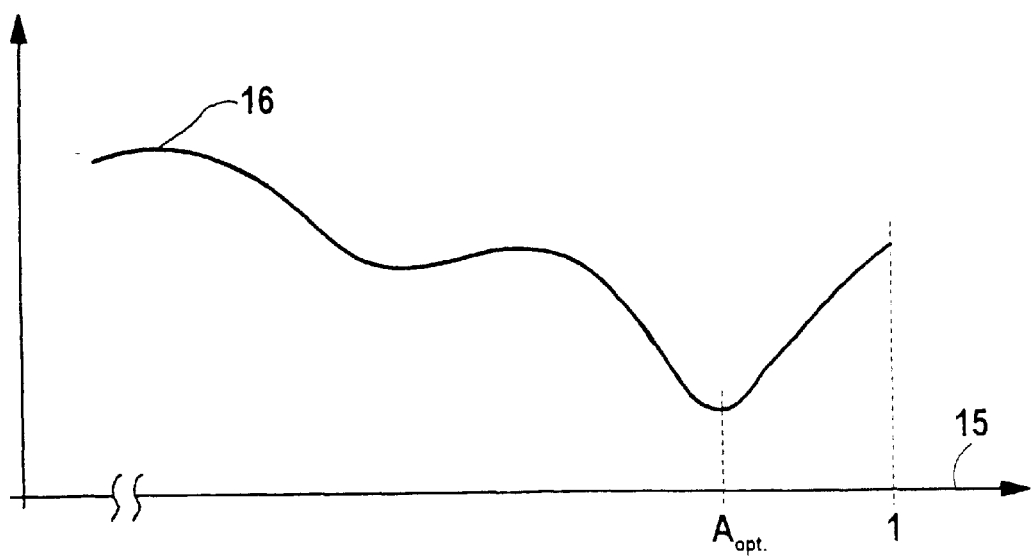
FIG. 3 shows a characteristic curve for determining an optimum control factor.

FIG. 3 shows the curve of line current total harmonic distortion factor 16 plotted against control factor 15 of the self-commutating DC converter. The control factor of a self-commutating DC converter is the ratio between the fundamental frequency peak of the voltage generated by DC converter 3 on the secondary side of transformer 2 and the maximum fundamental frequency peak of this voltage that can be generated by rectifier 3. For different pulse patterns for triggering the semiconductors of self-commutating DC converter 3, there is an optimum control factor $A_{opt}$, for which line voltage total harmonic distortion 16 is close to minimum. Control factor and link voltage $U_{ZK}$ have a certain relationship to one another, which depends on the effective value of the line voltage. Link voltage $U_{ZK}$ is therefore set so that an optimum control factor $A_{opt}$ is achieved, for which the respective available line voltage effective value is attained.

Figure 4:
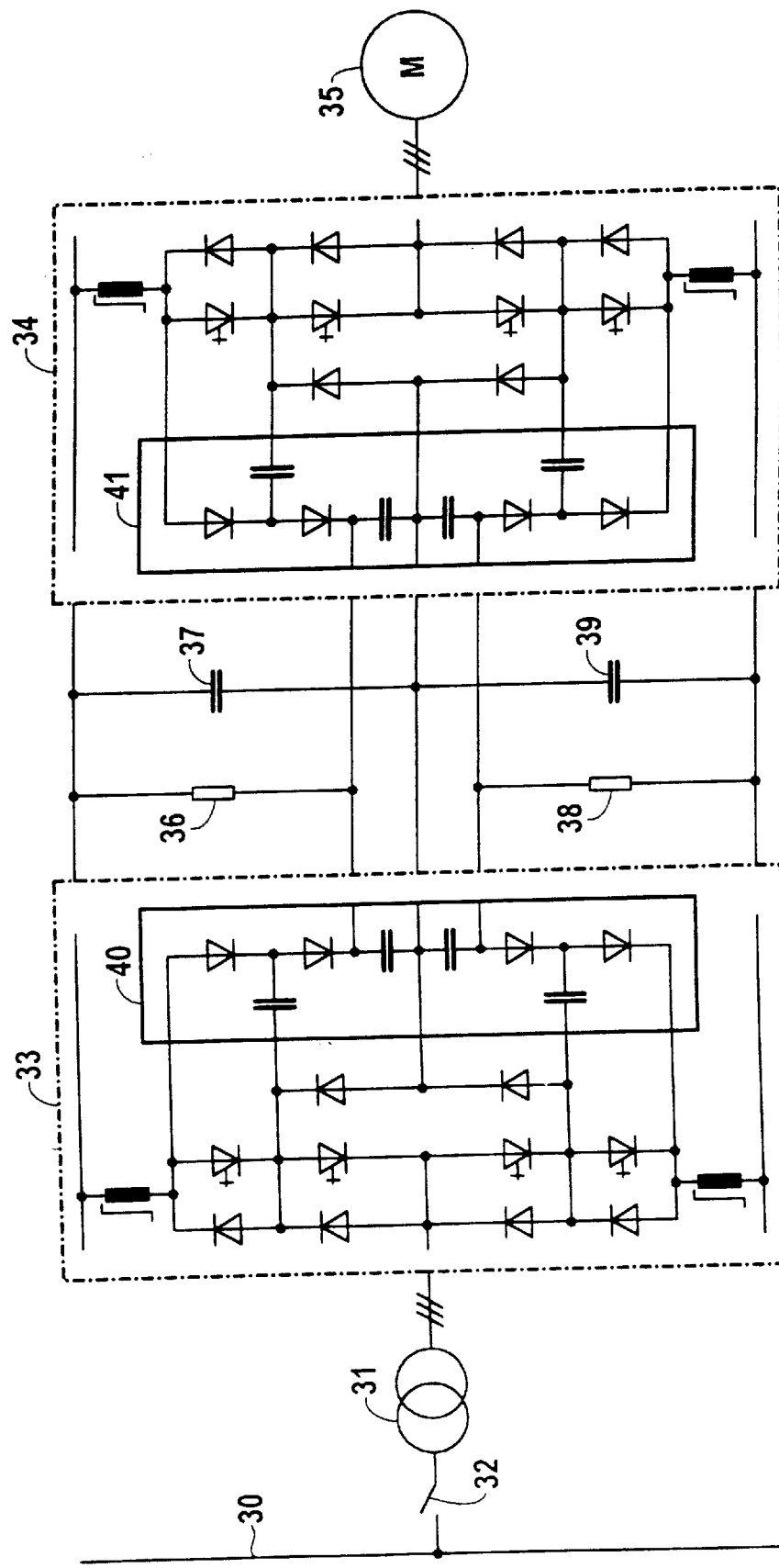
FIG. 4 shows a converter arrangement for supplying a three-phase motor with delta-connected converter sections on line and machine sides.

FIG. 4 shows a converter arrangement for powering a three-phase machine with line-side converter section 33 and motor-side converter section 34 designed with delta connected identical GTOs. The main circuit of each phase module is illustrated with its respective protective circuit 40, 41. Converter sections 33 and 34 each have three such phase modules with their respective protective circuits. P-side link capacitor 37 forms, together with N-side link capacitor 39, the DC voltage link circuit, through which both converter sections are connected. P-side protective charge-reversal resistor 36 and N-side protective charge-reversal resistor 38 are connected to the respective sides of protective circuits 40 and 41.

The input of line-side converter section 33 is connected to line 30 via transformer 31 and circuit breaker 32. The output of machine-side converter section 34 is connected to three-phase motor 35.

In the arrangement of FIG. 5, the outputs of a first converter 74 and a second converter 75 are connected to one side 71 and 72, respectively, of an open three-phase winding of three-phase motor 73. In addition to twice the power, particularly advantageous operating characteristics are achieved using this arrangement, since, if the pulse procedures are appropriately tuned, a largely sinusoidal current with low harmonics is achieved in the motor even at a low switching frequency of the GTO thyristors.

On the line side, first converter 74 is connected to the power supply line via an optional line-side additional inductance 63 and a first transformer 61, connected, for example, in star/delta with power supply line 60. Second converter 75 is connected to power supply line 60 (for example, in star/delta) via an optional line-side additional inductance 64 and a second transformer 62, preferably electrically offset by 30° with respect to first transformer 61. This arrangement results in particularly advantageous line reactions, in particular when, as in the present example, the converters are composed of converter sections connected in delta. Even in the case when the self-commutated line current converter is clocked at the fundamental frequency, the resulting current is sinusoidal with very low harmonics content.

The two converters 74 and 75 have line-side converter sections 66 and 65, respectively and machine-side converter sections 69 and 70, respectively, which are connected via a DC voltage link 67 and 68, respectively. The two DC voltage links 67 and 68 are electrically insulated from one another. All converter sections 66, 65, 69, 70 are connected in delta, preferably with RC-GTOs.

FIG. 6 shows the use of the drive systems according to the present invention in a rolling mill. Rolled stock 103 is rolled in roll stands 104, 105, 106, 107, which are driven by electric motors 99, 100, 101, 102. Motors 99, 100, 101, 102 are powered by a power supply line 90 via transformers 91, 92, 93, 94 and converters 95, 96, 97, 98. Converters 95, 96, 97, 98 have a self-commutated DC converter 3 with regulator 9, a voltage link 4, a self-commutated AC converter 5, a link voltage computing unit 8, and optionally a measuring device 7. In an alternative embodiment, one measuring device 7 whose measured values are supplied to all drive systems is used.

For higher horsepowers, the circuit according to FIG. 5, having two transformers, two converters and open motor windings, is used for the above-mentioned transformers 91, 92, 93, 94, converters 95, 96, 97, 98 and motors 99, 100, 101, 102.

What is claimed is:

1. A drive system for industrial plant sections, comprising:
   at least one electric motor;
   at least one converter, the at least one converter including a voltage link connecting the at least one electric motor to an AC-voltage power supply network, the at least one converter regulating at least one of i) an effective power consumption of the at least one electric motor, and ii) torque and rotational speed of the at least one electric motor, from the AC-voltage power supply network, a link voltage of the converter being set so that harmonics induced by the drive system are minimized in the AC-voltage power supply network to an optimum value; and
   a link voltage computing unit computing a link voltage setpoint value as a function of the voltage of the AC-voltage power supply network,
   wherein the link voltage is set as a function of measured values of a voltage of the AC-voltage power supply network so that the harmonics induced by the drive system are minimized in the AC-voltage power supply network to the optimum value.

2. The drive system according to claim 1, wherein the converter includes power semiconductors that are one of controlled and regulated using a regulating device.

3. The drive system according to claim 1, further comprising:
   a measuring device measuring an effective voltage of the AC-voltage power supply network.

4. The drive system according to claim 1, wherein the voltage link is a delta-connected DC voltage link.

5. The drive system according to claim 1, wherein the voltage link is a DC voltage link connected an n points, n being an integer value of between 2 and 10.

6. The drive system according to claim 1, wherein the converter includes gate turn-off power semiconductors, the gate turn-off power semiconductors being Gate Turn-off Thyristors.

7. The drive system according to claim 1, wherein the converter includes gate turn-off power semiconductors, the gate turn-off power semiconductors being MOS-Controlled Thyristors.

8. The drive system according to claim 1, wherein the converter includes gate turn-off power semiconductors designed as power transistors, the power transistors being Insulated Gate Bipolar Transistors.

9. The drive system according to claim 1, wherein the gate turn-off power semiconductors being reverse conductive.

10. A roll train, comprising:
    a roll stand for rolling rolled stock; and
    a drive system driving the roll stand, the drive system including:
      at least one electric motor,
      at lease one converter, the at least one converter including a voltage link connecting the at least one electric motor to an AC-voltage power supply network, the at least one converter regulating at least one of i) an effective power consumption of the at least one electric motor, and ii) torque and rotational speed of the at least one electric motor, from the AC-voltage power supply network, a link voltage of the converter being set so that harmonics induced by the drive system are minimized in the AC-voltage power supply network to an optimum value, and
      a link voltage computing unit computing a link voltage setpoint value as a function of the voltage of the AC-voltage power supply network, wherein the link voltage is set as a function of measured values of a voltage of the AC-voltage power supply network so that the harmonics induced by the drive system are minimized in the AC-voltage power supple network to the optimum value.

11. The roll train according to claim 10, further comprising:

a plurality of roll stands, the plurality of roll stands being driven by the drive system.

12. The roll train according to claim 10, wherein the rolled stock is a strip.

13. A method of rolling steel, comprising the steps of:

providing a roll stand for rolling rolled stock; and driving the roll stand with a drive system, the drive system including:
- at least one electric motor, and
- at lease one converter, the at least one converter including a voltage link connecting the at least one electric motor to an AC-voltage power supply network;

regulating by the at least one converter at least one of i) an effective power consumption of the at least one electric motor, and ii) torque and rotational speed of the at least one electric motor, from the AC-voltage power supply network;

setting a link voltage of the converter so that harmonics induced by the drive system are minimized in the AC-voltage power supply network to an optimum value;

setting the link voltage as a function of measured values of a voltage of the AC-voltage power supply network so that the harmonics induced by the drive system are minimized in the AC-voltage power supply network to the optimum value; and computing, by a link voltage computing unit, a link voltage setpoint value as a function of the voltage of the AC-voltage power supply network.

14. Rolled steel, comprising:

a steel strip rolled on a roll stand, the roll stand being driven by a drive system which includes at least one electric motor, at least one converter and a link voltage computing unit, the at least one converter including a voltage link connecting the at least one electric motor to an AC-voltage power supply network, the at least one converter regulating at least one of i) an effective power consumption of the at least tone electric motor, and ii) torque and rotational speed of the at least one electric motor, from the AC-voltage power supply network, a link voltage of the converter being set so that harmonics inducted by the drive system are minimized in the AC-voltage power supply network to an optimum value, wherein the link voltage is set as a function of measured values of a voltage of the AC-voltage power supply network so that the harmonics induced by the drive system are minimized in the AC-voltage power supply network to the optimum value, and wherein the link voltage computing unit computes a link voltage setpoint value as a function of the voltage of the AC-voltage power supply network.

* * * * *